May 2, 1950

C. B. MOUNTCASTLE 2,506,165

METHOD OF FORMING DESIGNS IN
RESINOUS PLASTIC ARTICLES

Filed Nov. 7, 1945

INVENTOR.
CHARLES B. MOUNTCASTLE

BY
ATTORNEYS

Patented May 2, 1950

2,506,165

UNITED STATES PATENT OFFICE 2,506,165

METHOD OF FORMING DESIGNS IN RESINOUS PLASTIC ARTICLES

Charles B. Mountcastle, Shaker Heights, Ohio, assignor, by mesne assignments, to Everett D. McCurdy, trustee Application November 7, 1945, Serial No. 627,178

5 Claims. (Cl. 41—41)

The present invention relates generally to the art of decoration and more particularly to a novel method of marking articles, especially those having resinous surfaces.

In general, aside from the attachment of foreign bodies to plastic surfaces which is comparatively unimportant commercially for various reasons including the always difficult bonding problem, such surfaces are commonly marked by either their limited attrition or accretion. They are, for instance, eroded by sand blasts or cutting tools or are formed with raised surface portions by molding techniques or pressure die means. Despite repeated attempts by the art to adapt these methods to enable economic and commercial production of fine-lined, delicate patterns of plastic articles, it has hitherto only been possible commercially to manufacture those which were crude and heavy-lined.

In accordance with my invention, which is based upon my discovery that a plastic surface can be marked by producing in situ a solution of a portion of the surface and solidifying in situ the dissolved portion, the production of extremely intricate and delicate designs in plastic articles is now for the first time commercially feasible. This represents a complete departure from the methods of the prior art as applied to articles of any composition and is an especially valuable contribution to the art so far as are concerned synthetic resin articles which in large percentage lend themselves to this solvent technique but are not readily processed for desirable designing results by other means.

Briefly, the process of the present invention comprises the steps of applying to a suitable surface a suitable solvent substance, thereby producing in situ in the surface a solution of said composition and the solvent, then solidifying the dissolved portion of the surface in situ by removing the solvent substance.

As herein used, the term "plastic" means and includes the various natural, semi-natural and synthetic resinous substances known to the art, and those substances which may be developed by the art, having solubility characteristics qualifying them for use in this process in substantially the same manner and to the same advantage as those presently known.

In this specification and the appended claims for convenience I have used the term "solvent" to mean and include those substances which are capable of dissolving plastics and the like but are not reactive to a material degree therewith. It is not desirable in this process to destroy the surface of the article in marking it as in conventional etching practice; but rather, it is the object of the process to effect marking by addition to the article particularly in its surface and sub-surface portion.

In accordance with my invention as I have satisfactorily practiced it in producing designs in the surfaces of plastic articles, I apply a stencil of the desired design to the surface of the article and contact the exposed portion of that surface defined by the openings in the stencil with a volatile substance which is capable of rapidly dissolving said exposed portion. When the article is composed of cellulose acetate, for example, I use acetone, brushing it across the stencil in quantity sufficient to dissolve the article to the desired extent. At the end of a suitable period for completion of solvent action, I apply heat and a draft of air to gasify and drive off the solvent or, as in the case of acetone which is highly volatile, merely expose the article to the atmosphere until the solvent is evaporated. Thereupon the stencil is removed and the design of the stencil is apparent upon the surface of the article.

As those skilled in the art will realize, various stenciling means are applicable with or without routine modifications in the process of this invention. Inasmuch as a solvent is used it is desirable, particularly if a delicate design is to be reproduced, that the stencil be resistant to the solvent and that it be fitted securely to the article to prevent diffusion of the solvent beyond the area of the surface defined by the stencil.

Preferably in the practice of this invention, before applying the solvent to the article to be marked, I disperse and/or dissolve chromatic materials in the solvent thus to produce designs of color rather than of mere surface irregularities. Comminuted metals and various highly colored dye substances are particularly desirable for this purpose, especially striking results being obtained with silver and copper powder applied separately but incorporated in various parts of a design. It is desirable, of course, that the chromatic material, which it is intended should remain in the design, be non-volatile if volatilization is the means to be employed in a subsequent step to remove the solvent substance from the object which receives the design, and that it not have solubility or other characteristics which so resemble those of the solvent as to complicate separation of solvent and chromatic material. It is further desirable that the chromatic material be substantially non-reactive with the composition of the object to which it is applied and with the solvent substance, if such reactiveness will result in undesirable effects if separation is effected by other than volatilization means.

Under certain circumstances in the practice of this invention, especially wherein comminuted metal is employed as a chromatic material, I prefer to admix thoroughly the said material with the plastic solution thereby substantially to inclose the metal particles in films of plastic and to produce a finished article having an unbroken plastic surface and having below that surface, in the form of the design of the stencil, the metal admixture. Particularly is this desirable where the article is to be put to a purely decorative use and will be subjected to metal-corroding influences. Thus, for example, an article of jewelry bearing an untarnishable monogram of lasting, brilliant, silvery luster can be produced by embedding comminuted silver in the article in accordance with the above description and thereby providing a protective and transparent coat for the metal.

Practically any colored, opaque and/or reflective material is suitable for use in this process. Mica, chalk, printing inks and the like may find general commercial use, for instance, in the production of printed cellophane for wrapping and decorating purposes and in the production of so-called "cold-light" articles such as roadside guiding and advertising signs which are sharply revealed by a beam of an electric torch. Here again, the matter of limitation upon design intricacy and weight of lines is removed by my invention for the first time.

In some instances it may be desirable vigorously to agitate the surface of the plastic article being treated with the solvent and disburse metal particles thus to produce a roughened finish in the surface portion of the article. Such treatment also results in admixture of solid particles of plastic in the solution of plastic and metal. This is a preferred technique if a figure containing no chromatic material in addition to that of the plastic composition is to be produced because a frosted-glass effect is obtained and the design is effectively emphasized over its surroundings.

Removal of the solvent and solidification in situ of the dissolved portion of the article is desirably accomplished by effecting evaporation as above stated. Depending upon its volatility and effectiveness as a solvent and upon the desired depth of solvent penetration in the article, the solvent will be used in greater or lesser volume and will suitably be evaporated with or without the application of heat and/or a stream of air or other suitable gaseous substance. In a commercial installation wherein conditions are adjusted and maintained properly in a routine manner solvent removal by evaporation will be best effected and the most uniform results will be obtained if air of an elevated temperature below that which would detrimentally affect the article is blown in contact with the portion of the article to be freed of solvent until solvent volatilization is complete. Removal of the solvent by other means such as by bringing a material into the solvent which upsets the solubility relationship between the plastic substance of the article and the solvent thereby causing solidification of said plastic substance theretofore in solution and enabling removal of the solvent from the article by adsorption without appreciable loss of that substance, is also contemplated by the appended claims. This may practically be used in the event that the solvent recovery is particularly desired and is not economically feasible in conjunction with the evaporation technique.

The terms "volatile" and "non-volatile" are employed herein and in the appended claims in accordance with their conventional and well understood usage and meaning in the art.

A large proportion of all resinous compositions are, to the common knowledge of the art, capable of being dissolved without chemical reaction and are therefore suitable for use in the process of this invention. Glass, metal, wood and the like, being practically insoluble or not soluble to a commercial extent in any substance without chemical reaction, are not my preference for use in this invention.

Because of their ready solubility in the common and inexpensive commercial solvents, I prefer to apply my invention to the regenerated cellulose plastics including cellulose acetate, cellulose aceto-butyrate, methyl cellulose, and ethyl cellulose and cellulose nitrate. It is to be understood, however, that the alkyd, formaldehyde, vinyl, ethenoid and other common as well as uncommon types of resinous materials which under certain circumstances known to those skilled in the art, can be dissolved to suitable extent and are fitted for commercial use in accordance with my invention.

The following illustrative but not limiting example of my present invention as I have actually practiced it is offered further to reveal its essential elements especially to those skilled in the art:

*Example*

A plate of clear, commercial, methyl methacrylate resin was coated with a light sensitive film of the type customarily used in photography. A positive transparency of the desired design was placed in contact with this film and exposed to a light source. The resulting latent image was then developed and washed as is customary in the photographic art and the surface of the plate of the desired design was exposed while the rest of the plate was covered by the resulting photographic stencil background. A mixture of ethylene dichloride and comminuted copper was applied with a fine brush to the stenciled portion of the surface, and the ethylene dichloride was completely volatilized and the plate was dry after a few minutes' contact of the plate with the atmosphere at room temperature. The plate was harshly brushed only in the portion overlying part of the design to expose the copper, and then that part, as an anode, was submerged in an electrolytic bath containing silver ions. Electric current was caused to pass through the bath, resulting in deposition of silver in an even film upon the exposed comminuted copper surface of the design.

With reference to the drawings accompanying and forming a part of this specification:

Figure 1:
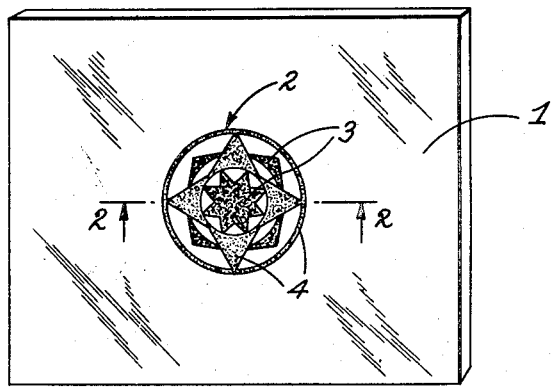
Fig. 1 is a perspective view of the article produced in the above example.
Figure 2:
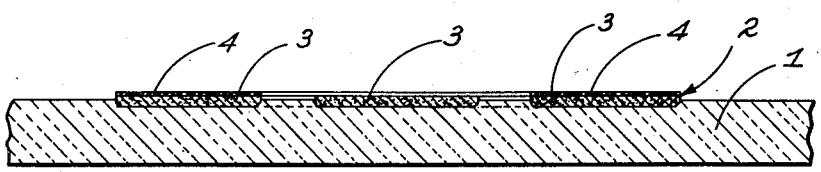
Fig. 2 is a view in cross section of the article taken on line 2—2 of Fig. 1.

In general the illustrated article consists of transparent plastic plate 1 and the intricate, fine-line design 2 borne upon and within said plate. This design consists of plastic-coated copper surface 3, which is exposed to view but not to the atmosphere, and silver surface 4. As shown in Fig. 1, but more apparent in Fig. 2, this design rises to a small extent above the surface of the plate and is rough in contrast to the very even surface of said plate. As further shown in detail in Fig. 2, the copper of the design extends superficially into the plate and is overlaid in some portions by a film of a plastic material dissolved and solidified during the foregoing application and removal of ethylene dichloride to the plate, and in the other portions by the electrolytically deposited silver sheet.

Figure 3:
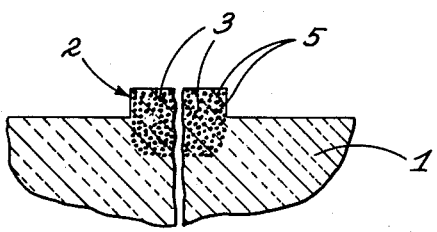
Fig. 3 is a highly magnified view of a portion of the section of Fig. 2.

In Fig. 3 the nature of the bond between the copper particles and the plastic article is clearly apparent as the discrete copper particles 5 are shown surrounded by the plastic and the article and the copper particles thus are fully integrated. In a sense the structure illustrated in this magnified view of a portion of the cross section of Fig. 2 may be regarded as a continuous network of plastic throughout which the copper particles are distributed.

In addition to decorative uses articles produced in accordance with this invention may be applied commercially in the electrical field, for instance, where di-electric substances must be firmly and securely bound to electric conductors. A plastic rod, for example, is suitably prepared as an insulator by exposing a portion of its surface to a solvent admixed with comminuted copper, silver, graphite, or like electrically conductive material and after volatilization of the solvent, is brushed to provide the necessary electrically conductive surface for contact, as by soldering, with other electrically conductive elements such as copper wires. A much more effective and strongly adhering bond is thereby produced than by means heretofore employed in the art in connection with plastic compositions. Thus, plastic-metal bonding difficulties are eliminated in a commercially feasible manner for the first time and the way is opened by this invention to general use of plastics in the electrical art.

Having thus described my invention so that others skilled in the art may be able to understand and practice the same, I state that what I desire to secure by Letters Patent is defined in what is claimed.

I claim:

1. The method of forming a design of predetermined form and dimensions in a resinous plastic article which comprises the steps of applying a stencil to expose a portion of the surface of the article of the desired design, contacting the exposed portion of the surface with a mixture of a solvent for said plastic article and comminuted metal thereby to soften a portion of said exposed surface, vigorously agitating the surface of the article thus contacted with the solvent-metal mixture in order to embed said metal in said surface, volatilizing the solvent, and abrading the portion of said surface overlying the resulting metal deposit in the plastic article to expose the metal of the deposit and to define a continuous metal surface.

2. The method of forming a design of predetermined form and dimensions in a resinous plastic article which comprises the steps of contacting an exposed portion of the surface of the article defining said design with a mixture of a solvent for said plastic article and comminuted metal thereby to soften a portion of said exposed surface, vigorously agitating the surface of the article thus contacted with the solvent-metal mixture in order to embed said metal in said surface, volatilizing the solvent, and abrading the portion of said surface overlying the resulting metal deposit in the plastic article to expose the metal of the deposit and to define a continuous metal surface.

3. The method of forming a design of predetermined form and dimensions in a resinous plastic article which comprises the steps of applying a stencil to expose a portion of the surface of the article of the desired design, contacting the exposed portion of the surface with a solvent for said plastic article thereby to soften a portion of said exposed surface, contacting said softened portion with comminuted metal, vigorously agitating the surface of the article thus contacted with the solvent and said metal in order to embed said metal in said surface, volatilizing the solvent, and abrading the portion of said surface overlying the resulting metal deposit in the plastic article to expose the metal of the deposit and to define a continuous metal surface.

4. The method of forming a design of predetermined form and dimensions in a resinous plastic article which comprises the steps of applying a stencil to expose a portion of the surface of the article of the desired design, contacting the exposed portion of the surface with a mixture of a solvent for said plastic article and comminuted metal thereby to soften a portion of said exposed surface, vigorously agitating the surface of the article thus contacted with the solvent-metal mixture in order to embed said metal in said surface, volatilizing the solvent, and removing the portion of said surface overlying the resulting metal deposit in the plastic article to expose the metal of the deposit and to define a continuous metal surface.

5. The method of forming a design of predetermined form and dimensions in a resinous plastic article which comprises the steps of contacting an exposed portion of the surface of the article defining said design with a solvent for said plastic article thereby to soften a portion of said exposed surface, contacting said softened portion with comminuted metal, vigorously agitating the surface of the article thus contacted with the solvent and said metal in order to embed said metal in said surface, volatilizing the solvent, and reducing the film of resinous plastic coating the outer faces of the grains of comminuted metal in the face of the design to form an electro-conductive surface.

CHARLES B. MOUNTCASTLE.

REFERENCES CITED

The following references are of record in the file of this patent:

UNITED STATES PATENTS

| Number | Name | Date |
|---|---|---|
| 1,149,974 | Chisholm | Aug. 10, 1915 |
| 1,342,767 | Schlesinger | June 8, 1920 |
| 1,694,466 | Clavel | Dec. 11, 1928 |
| 2,214,646 | Walker | Sept. 10, 1940 |
| 2,281,100 | Land | Apr. 28, 1942 |
| 2,281,837 | Ford | May 5, 1942 |
| 2,314,975 | Ford | Mar. 30, 1943 |